April 24, 1934.      K. L. HERRMANN      1,956,289
ANTIFRICTION BEARING
Filed Sept. 19, 1931
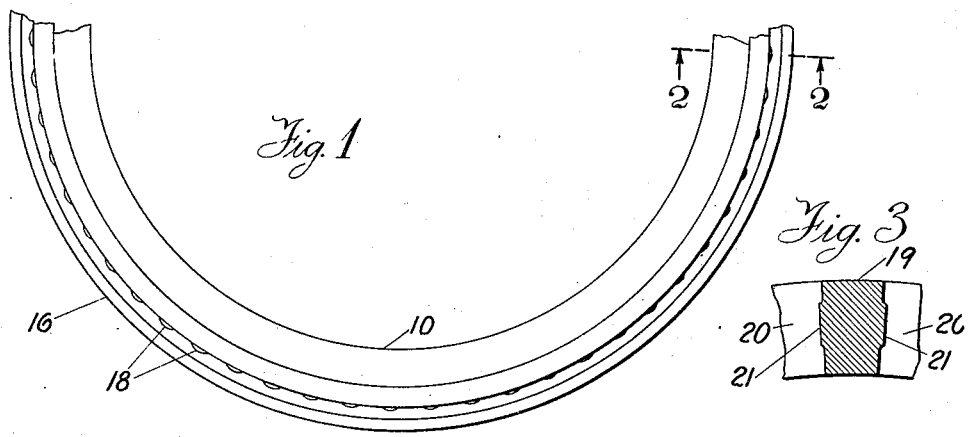
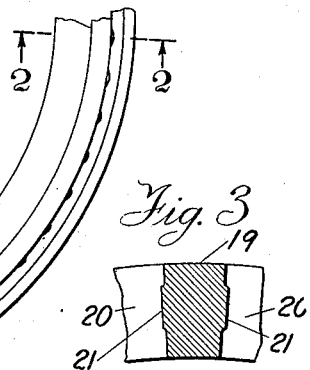
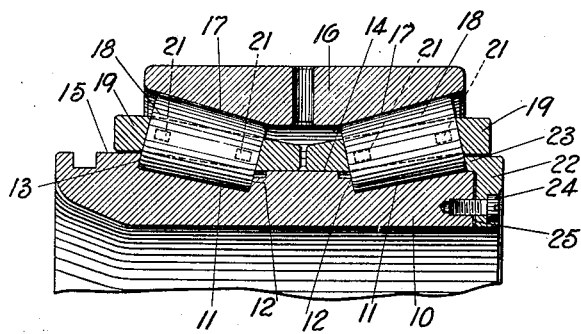
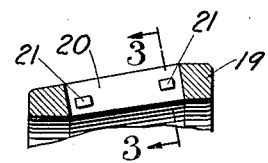
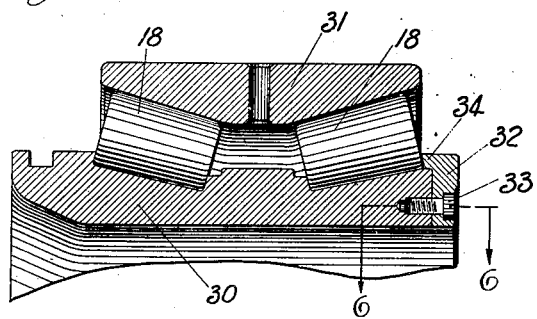
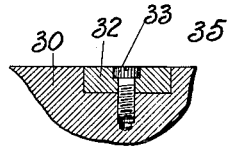
INVENTOR.
Karl L. Herrmann
BY
ATTORNEYS.

Patented Apr. 24, 1934

1,956,289

UNITED STATES PATENT OFFICE 1,956,289

ANTIFRICTION BEARING

Karl L. Herrmann, South Bend, Ind., assignor to The Bantam Ball Bearing Company, South Bend, Ind., a corporation of Indiana Application September 19, 1931, Serial No. 563,717

5 Claims. (Cl. 308—214)

This invention relates to anti-friction bearings and particularly to bearings provided with tapered rollers, providing for radial and thrust loads.

The principal object of my invention is to provide a bearing of the class described having a one-piece inner race member and a one-piece outer race member together with means for permitting the easy assemblying of the rollers in the race members.

A further object is to provide a combined radial and thrust bearing having two independent rows of tapered rollers interposed between single piece inner and outer race members.

A further object is to provide a bearing of the class described which has an inner race member provided with spaced radial faces forming seats for the roller retaining ring.

A further object is to provide a single piece inner race member for a bearing of the class described so shaped that the rollers can be assembled and disassembled without destroying any of the other parts of the bearing.

A still further object is to provide a spacing member for the rollers having apertures therein, the side walls of which are formed with protuberances thereon whereby the rollers have four points of contact with the retainer.

The above being among the objects of the present invention, the same consists of certain details of manufacture and construction which will be apparent from the drawing, the same being for the purpose of illustration only and not as limiting the scope of the invention.

In the drawing:

Figure 1 is a fragmentary side elevation of the bearing including my invention.

Figure 2 is an enlarged fragmentary sectional view taken on the line 2—2 of Figure 1.

Figure 3 is a fragmentary sectional view showing a part of the roller retainer taken on the line 3—3 of Figure 4.

Figure 4 is a fragmentary sectional view showing further the details of the roller retainer.

Figure 5 is a view similar to Figure 2 showing a modified form of the invention.

Figure 6 is a fragmentary sectional view taken on the line 6—6 of Figure 5.

Heretofore it has been the practice to build bearings having double rows of tapered rollers with either a two-piece inner race member or a two-piece outer race member, as such construction was found necessary in order that the separate rows of rollers could be assembled in the race members. Such a construction is costly to manufacture and otherwise unsatisfactory because of slight inaccuracies in the several parts of the bearing and the difficulty in so assembling the several units that given clearances or fits cannot be maintained.

In the present invention, I have found that bearings of the type described, including single piece inner and outer race members, can be made more accurately thereby giving greater life than bearings heretofore manufactured, and I have also devised a means whereby the rollers can be assembled and disassembled without destroying any of the working parts of the bearing which have been necessary in bearings heretofore on the market.

To better understand the invention, reference may be had to the accompanying drawing in which the inner race member 10 is provided with tapered race ways 11 having inner end walls 12, one of which has an outer end wall 13. Intermediate the end walls 12 of the race ways I provide a cylindrical face 14 for a purpose to be hereinafter described. Adjacent to the end wall 13, I also provide a cylindrical face 15 larger in diameter than the face 14, also for a purpose to be hereinafter described. The one-piece outer race member 16 is provided with converging faces 17 as illustrated in Figure 2, and between the inner and outer race members 10 and 16 are interposed two rows of tapered rollers 18.

The rollers as illustrated in Figure 2 are preferably spaced apart by the retaining members 19 having pockets 20 formed therein to receive the rollers 18. The spacing members 19 have protuberances or lugs 21 formed thereon which may be ground to a given size and shape whereby the rollers 18 may contact therewith and have four points of bearing on the retainers 19. It is desirable that the rollers do not contact with the full faces of the walls or pockets 20 because of the friction encountered thereby and I, therefore, have found the use of the lugs to be highly advantageous and to center up the rollers so that they will run true in their race ways and will be equally spaced from each other. The rollers when assembled in the bearing are retained against longitudinal movement by the ring 22 which has a projection 23 formed thereon engageable with the end faces of one row of rollers. The ring 22 is held in position against the end face of the inner bearing member 10 by means of the screws 24. I preferably provide shims 25 between the ring 22 and the inner race member 10 to provide for adjustment of the rollers which may be necessary due to wear and other causes.

One of the roller retainers 19 seats on the cylindrical faces 14 and 15 of the inner race member 10, and the other roller retainer 19 seats on the cylindrical face 14 and the outer face of the ring 22 in a manner so that the retainers together with the rollers are free to rotate relative to the race members 10 and 16.

In assemblying the bearing, the left hand retainer is slipped over the inner race member 10 to the position shown in Figure 2 after which the rollers 18 are inserted in the pockets 20. The outer race member 16 is then slipped over the left hand row of rollers to the position shown after which the right hand row of rollers are inserted in the right hand retainer 19 and the retainer and rollers are then inserted between the inner and outer race members 10 and 16 to the position shown. The ring 22 is then secured to the end face of the inner race member 10 whereby the rollers are locked in position against longitudinal movement and the bearing is completely assembled.

To disassemble the bearing for repair or replacement, it is not necessary to destroy any of the bearing parts as has been the practice in the past, but on the contrary the ring 22 may be removed after which the right hand row of rollers 18 may be withdrawn from the bearing, the outer race member taken off, and the left hand row of rollers with its retainer may be removed, thus the bearing is completely disassembled and such repair or replacement as may be necessary can be made.

In the manufacture of the bearing, there normally is a slight clearance between the end walls 12 of the race ways 11 and the rollers 18. As the parts become worn in use, the ring 22 can be removed and one of the shims 25 taken out whereby any looseness or play in the bearing can be taken up and the bearing is again in good condition for further use.

In Figures 5 and 6, I have shown a slightly modified form of invention which includes an inner race member 30 substantially like the inner race member 10 shown in Figure 2 and an outer race member 31 which may be identical with the outer race member 16 previously described. In this construction, I eliminate the roller retainers and use a full row of rollers in each group.

In assemblying, the outer race member 31 may be slipped over the inner race member 30 and the left hand row of rollers 18 can be interposed therebetween after which the outer race member 31 can be moved slightly farther to the left to the position shown in Figure 5. In this construction, I provide a keeper 32 adapted to be attached to the end of the inner race member 30 by means of the screws 33. As illustrated in Figures 5 and 6, this keeper has a projection 34 covering a slot 35 formed in the inner race member 30 so that the rollers 18 for the right hand row can be inserted between the inner and outer race members through this slot. When the full row of rollers in the right hand row has been inserted between the inner and outer race members, the keeper 32 is screwed into position and the rollers are thereby locked against longitudinal movement and the bearing is completely assembled.

While I have shown two embodiments of the present invention, it will be well understood to those skilled in the art that various changes and modifications can be made without departing from the spirit and scope of the invention and I, therefore, desire to claim the invention broadly as well as specifically as indicated by the appended claims.

What I claim:

1. An anti-friction bearing comprising, an inner race member having converging race ways, a cylindrical surface between said race ways, and a cylindrical surface of greater diameter than said first named cylindrical surface adjacent to the outer wall of one of said race ways, a one-piece outer race member having converging faces, tapered rollers interposed between said inner and outer race members in said race ways, a retaining ring secured to said inner race member having a cylindrical surface substantially the same diameter as the larger cylindrical surface on said inner race member, and retainers for said rollers, one seating on the first and second named cylindrical surfaces and the other seating on the first and third named cylindrical surfaces.

2. An anti-friction bearing comprising, a one-piece inner race member having converging race ways, a row of rollers in each of said race ways, a one-piece outer race member having converging faces conforming with the face angle of said rollers, means detachably secured to the edge face of said inner race member and provided with a projecting portion overlapping the cylindrical face thereof to prevent removal of said rollers from said bearing, and means supported by said inner race member and said retaining means for spacing said rollers relative to each other.

3. An anti-friction bearing comprising, a one-piece inner race member having converging race ways, and a cylindrical face intermediate said race ways, said inner race member also having a cylindrical face adjacent to the opposite end of one of said race ways, tapered rollers mounted in said race ways, an outer race member for said rollers, a retaining ring for said rollers having a cylindrical face substantially the same diameter as the last-named cylindrical face secured to the end face of said inner race member at the side opposite the said cylindrical face, and retainers for said rollers supported by the cylindrical face on said inner race member intermediate said rollers and by the outer cylindrical face on said inner race member and by said retaining ring respectively.

4. An anti-friction bearing comprising, a one-piece inner race member having converging race ways, tapered rollers supported in said race ways, an outer race member for said rollers, a retaining ring for said rollers secured to an edge face of said inner race member and overlapping the cylindrical face thereof, spacing means for said rollers one of which is supported by said inner race member, the other by said race member and said retaining ring, and means on said spacing means whereby said rollers have a four-point contact with said spacing means.

5. An anti-friction bearing comprising, a one-piece inner race member having converging race-ways and spaced cylindrical faces, a one-piece outer race member having converging race-ways, tapered rollers interposed between the corresponding race-ways on said inner and outer race members, a plurality of retainers for said rollers bearing on said cylindrical faces, and means detachably secured to the end face of said inner race member having a cylindrical face forming a bearing for one of said retainers, said means permitting disassembly of said bearing for inspection and repair.

KARL L. HERRMANN.